United States Patent
Tajima et al.

(10) Patent No.: US 10,397,431 B2
(45) Date of Patent: Aug. 27, 2019

(54) GRAPHICS PROCESSING DEVICE, IMAGE PROCESSING APPARATUS, GRAPHICS PROCESSING METHOD, AND RECORDING MEDIUM

(71) Applicant: Konica Minolta, Inc., Chiyoda-ku, Tokyo (JP)

(72) Inventors: Hiroki Tajima, Itami (JP); Hozuma Nakajima, Toyokawa (JP); Kazuaki Tomono, Okazaki (JP); Kenzo Yamamoto, Toyohashi (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/450,677

(22) Filed: Mar. 6, 2017

(65) Prior Publication Data
US 2017/0264769 A1    Sep. 14, 2017

(30) Foreign Application Priority Data
Mar. 14, 2016    (JP) .................................. 2016-049551

(51) Int. Cl.
*H04N 1/00*    (2006.01)
*G06T 1/20*    (2006.01)

(52) U.S. Cl.
CPC ........... *H04N 1/00957* (2013.01); *G06T 1/20* (2013.01); *H04N 1/00411* (2013.01); *H04N 1/00472* (2013.01); *G06T 2200/24* (2013.01); *H04N 2201/0094* (2013.01)

(58) Field of Classification Search
CPC ........... H04N 1/00957; H04N 1/00411; H04N 1/00472; G06T 1/20

USPC .......................................... 345/501, 502, 52
See application file for complete search history.

(56) References Cited

U.S. PATENT DOCUMENTS

| | | | | |
|---|---|---|---|---|
| 2003/0069945 | A1* | 4/2003 | Gregson | G06Q 10/06393 709/220 |
| 2009/0109230 | A1* | 4/2009 | Miller | G06F 1/3203 345/506 |
| 2009/0287824 | A1* | 11/2009 | Fisher | G06F 9/542 709/226 |
| 2011/0164046 | A1 | 7/2011 | Niederauer et al. | |

(Continued)

FOREIGN PATENT DOCUMENTS

JP    2013-516697 A    5/2013

*Primary Examiner* — Sarah Lhymn
(74) *Attorney, Agent, or Firm* — Buchanan Ingersoll & Rooney PC

(57) ABSTRACT

A graphics processing device includes: a CPU corresponding to a general-purpose; and a GPU corresponding to a special-purpose for graphics processing, the GPU being configured to necessitate draw call batching before the GPU starts its operation, wherein: the CPU judges which device, the CPU itself or the GPU, should perform graphics processing to generate a screen image to be displayed on a display with reference to the number of screen elements composing the screen image; and the CPU performs graphics processing to generate the screen image if the CPU judges that the CPU itself should perform graphics processing, and the CPU performs draw call batching then makes the GPU perform graphics processing to generate the screen image if the CPU judges that the GPU should perform graphics processing.

18 Claims, 12 Drawing Sheets

| Number of the Elements | | Pixel Count | | | Sample Screen |
|---|---|---|---|---|---|
| | | WSVGA (600 x 1024 pixels) | WVGA (480×800 pixels) | WQVGA (273×400 pixels) | |
| | | The optimal computing device is: GPU, if 20 or more screen elements CPU, if less than 20 screen elements | The optimal computing device is: GPU, if 50 or more screen elements CPU, if less than 50 screen elements | The optimal computing device is: GPU, if 100 or more screen elements CPU, if less than 100 screen elements | |
| Very high number | Buttons 50 Graphics 67 Text Strings 85 Total 202 | GPU should perform graphics processing | GPU should perform graphics processing | GPU should perform graphics processing |  |

(56) References Cited

U.S. PATENT DOCUMENTS

| | | | | |
|---|---|---|---|---|
| 2012/0291040 A1* | 11/2012 | Breternitz | ............ | G06F 9/5083 |
| | | | | 718/104 |
| 2014/0327686 A1* | 11/2014 | Jia | ............................ | G06T 1/20 |
| | | | | 345/522 |
| 2014/0368516 A1* | 12/2014 | Taggart | ..................... | G06T 1/20 |
| | | | | 345/505 |
| 2015/0130821 A1* | 5/2015 | Shah | ..................... | G06F 1/3206 |
| | | | | 345/520 |
| 2015/0279067 A1* | 10/2015 | Yuda | ........................ | G06F 3/14 |
| | | | | 345/441 |
| 2016/0350245 A1* | 12/2016 | Shen | ..................... | G06F 9/4843 |

* cited by examiner

| Number of the Elements | | | Pixel Count | | | Sample Screen |
|---|---|---|---|---|---|---|
| | | | WSVGA (600 x 1024 pixels) | WVGA (480×800 pixels) | WQVGA (273×400 pixels) | |
| | | | The optimal computing device is: GPU, if 20 or more screen elements CPU, if less than 20 screen elements | The optimal computing device is: GPU, if 50 or more screen elements CPU, if less than 50 screen elements | The optimal computing device is: GPU, if 100 or more screen elements CPU, if less than 100 screen elements | |
| Very high number | Buttons | 50 | GPU should perform graphics processing | GPU should perform graphics processing | GPU should perform graphics processing | |
| | Graphics | 67 | | | | |
| | Text Strings | 85 | | | | |
| | Total | 202 | | | | |
| High number | Buttons | 18 | GPU should perform graphics processing | GPU should perform graphics processing | CPU should perform graphics processing | |
| | Graphics | 27 | | | | |
| | Text Strings | 29 | | | | |
| | Total | 74 | | | | |

| Number of the Elements | | Pixel Count | | | Sample Screen |
|---|---|---|---|---|---|
| | | WSVGA (600 x 1024 pixels) | WVGA (480×800 pixels) | WQVGA (273×400 pixels) | |
| | | The optimal computing device is: GPU, if 20 or more screen elements CPU, if less than 20 screen elements | The optimal computing device is: GPU, if 50 or more screen elements CPU, if less than 50 screen elements | The optimal computing device is: GPU, if 100 or more screen elements CPU, if less than 100 screen elements | |
| Middle | Buttons 6<br>Graphics 9<br>Text Strings 12<br>Total 27 | GPU should perform graphics processing | CPU should perform graphics processing | CPU should perform graphics processing | (Sample screen with Bookmarks, Sending Menu, Admin Only, Line Type Settings, Box Settings, Character Conversion Time Settings; "Now activating…"; "Admin Settings>Box Settings>Character Conversion Time") |
| Small | Buttons 0<br>Graphics 3<br>Text Strings 1<br>Total 4 | CPU should perform graphics processing | CPU should perform graphics processing | CPU should perform graphics processing | (Sample screen: "Please turn on the vendor's power.") |

GRAPHICS PROCESSING DEVICE, IMAGE PROCESSING APPARATUS, GRAPHICS PROCESSING METHOD, AND RECORDING MEDIUM

This application claims priority under 35 U.S.C. § 119 to Japanese Patent Application No. 2016-049551 filed on Mar. 14, 2016, the entire disclosure of which is incorporated herein by reference in its entirety.

BACKGROUND OF THE INVENTION

Field of the Invention

The present invention relates to: a graphics processing apparatus that performs graphics processing to generate a screen image to be displayed on a display; an image processing apparatus provided with this graphics processing device; a graphic processing method; and a recording medium.

Description of the Related Art

The following description sets forth the inventor's knowledge of related art and problems therein and should not be construed as an admission of knowledge in the prior art.

For example, an image processing apparatus such as a multi-functional digital machine i.e. a multi-function peripheral (MFP) performs graphics processing to display an operation screen on a display of its operation panel. Specifically, the image processing apparatus performs graphics processing by a central processing unit (CPU) i.e. a general-purpose computing device used in the image processing apparatus itself or by a graphics processing unit (GPU) i.e. a special-purpose computing device that performs microprocessing optimally for graphics processing.

As referred to a straight line L1 in FIG. 12, the time required for graphics processing by the CPU increases in proportion to the pixel count of the display. In contrast, as referred to a straight line L2 in FIG. 12, the time required for graphics processing by the GPU increases only very slightly in proportion to the pixel count of the display, or rather, it is almost constant. In this case, however, it is troublesome that the time for draw call batching as a preprocessing step of graphics processing is further required. The draw call batching is combining the attributes of all screen elements, such as textures, materials, and coordinates, into a single batch of data in a certain format. The CPU performs this draw call batching and issues a command for graphics processing to the GPU using the obtained data.

Comparing the time required for graphics processing between the CPU and the GPU, as is understood from FIG. 12, the CPU will perform graphics processing faster if the display has a low pixel count, and the GPU will perform graphics processing faster if the display has a high pixel count.

As a solution to this problem, there is a computer system that allows a CPU to perform graphics processing to generate a low-resolution video and that allows an independent GPU to perform graphics processing to generate a high-resolution or high-bit-rate video, as described in Paragraph [0044] of Japanese Unexamined Patent Application Publication (Japanese Translation of a PCT International Patent Application Publication) No. 2013-516697.

As is evident from the inventor's study, however, the time required for graphics processing by the CPU varies depending on the number of the screen elements composing a screen image to be displayed on the display, and in contrast, the time required for graphics processing by the GPU hardly varies depending on the number of the screen elements, or rather, it is almost constant. Specifically, if the number of the screen elements is low and the pixel count is high, the time required for graphics processing by the CPU is shorter than the other; if the number of the screen elements is high and the pixel count is low, the time required for graphics processing by the CPU is longer than the other. That is because the CPU needs to repeat graphics processing for one screen element until it reaches the number of the screen elements composing one entire screen image.

The heretofore known technique is configured to judge which device, the CPU or the GPU, should perform graphics processing with reference to the pixel count of the display as described above, but it cannot select the CPU or the GPU, whichever will perform graphics processing really faster.

SUMMARY OF THE INVENTION

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

A first aspect of the present invention relates to a graphics processing device including:

a CPU corresponding to a general-purpose; and a GPU corresponding to a special-purpose for graphics processing, the GPU being configured to necessitate draw call batching before the GPU starts its operation, wherein:

the CPU judges which device, the CPU itself or the GPU, should perform graphics processing to generate a screen image to be displayed on a display with reference to the number of screen elements composing the screen image; and the CPU performs graphics processing to generate the screen image if the CPU judges that the CPU itself should perform graphics processing, and the CPU performs draw call batching then makes the GPU perform graphics processing to generate the screen image if the CPU judges that the GPU should perform graphics processing.

A second aspect of the present invention relates to a graphics processing method to be implemented by a graphics processing device, the graphics processing device including:

a CPU corresponding to a general-purpose; and a GPU corresponding to a special-purpose for graphics processing, the GPU being configured to necessitate draw call batching before the GPU starts its operation, the graphics processing method comprising the following steps of the CPU:

judging which device, the CPU itself or the GPU, should perform graphics processing to generate a screen image to be displayed on a display with reference to the number of screen elements composing the screen image; and performing graphics processing to generate the screen image if it is judged that the CPU should perform graphics processing, and performing draw call batching then making the GPU perform graphics processing to generate the screen image if it is judged that the GPU should perform graphics processing.

A third aspect of the present invention relates to a non-transitory computer-readable recording medium storing a graphics processing program for a graphics processing device, the graphics processing device comprising:

a CPU corresponding to a general-purpose; and a GPU corresponding to a special-purpose for graphics processing, the GPU being configured to necessitate draw call batching before the GPU starts its operation, the graphics processing program to make the CPU execute:

judging which device, the CPU itself or the GPU, should perform graphics processing to generate a screen image to be displayed on a display with reference to the number of screen elements composing the screen image; and performing graphics processing to generate the screen image if it is judged that the CPU should perform graphics processing, and performing draw call batching then making the GPU perform graphics processing to generate the screen image if it is judged that the GPU should perform graphics processing.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying drawings, in which:

FIGS. 5A and 5B are an explanatory table on threshold values for judging which device, the CPU or the GPU, should perform graphics processing, which are set in advance on the pixel count of the display and the number of the screen elements;

FIGS. 6C and 6D are another explanatory table on threshold values for judging which device, the CPU or the GPU, should perform graphics processing, which are set in advance on the pixel count of the display and the number of the screen elements;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, some embodiments of the present invention will be described with reference to the accompanying drawings.

Figure 1:
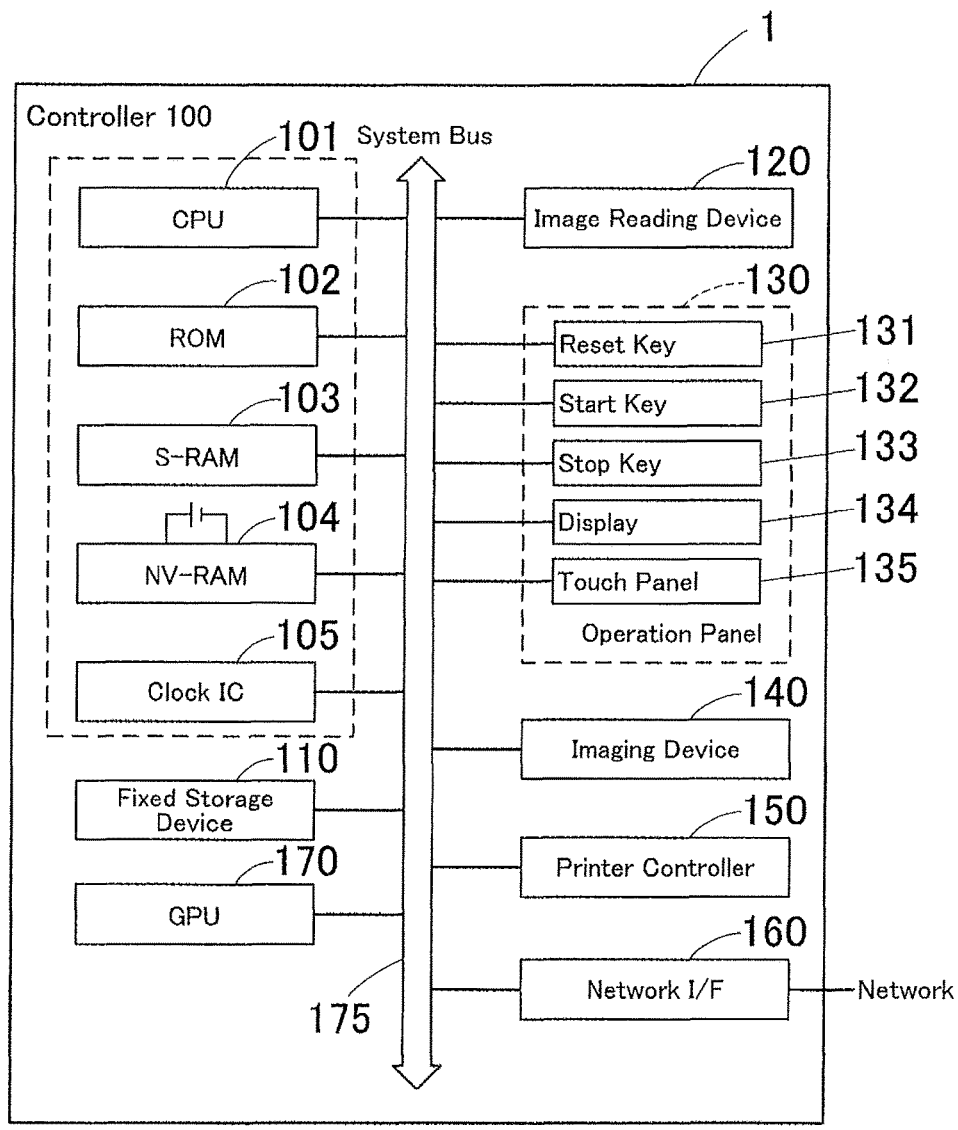
FIG. 1 is a block diagram illustrating an electrical configuration of an image processing apparatus that is provided with a graphics processing device according to one embodiment of the present invention.

FIG. 1 is a block diagram illustrating an electrical configuration of an image processing apparatus that is provided with a graphics processing device according to one embodiment of the present invention. In this embodiment, an MFP, i.e., a multifunctional digital image forming apparatus as described above is used as an image processing apparatus. Hereinafter, an image processing apparatuses will also be referred to as "MFP".

As illustrated in FIG. 1, an MFP 1 is essentially provided with a controller 100, a fixed storage device 110, an image reading device 120, an operation panel 130, an imaging device 140, a printer controller 150, a network interface (network I/F) 160, and a graphics processing unit (GPU) 170, all of which are connected to each other through a system bus 175.

The controller 100 is essentially provided with a central processing unit (CPU) 101, a read-only memory (ROM) 102, a static random access memory (S-RAM) 103, a non-volatile random access memory (NV-RAM) 104, and a clock IC 105.

The CPU 101 controls the MFP 1 in a unified and systematic manner by executing programs stored on a recording medium such as the ROM 102. For example, the CPU 101 controls the MFP 1 to enable copier function, printer function, scanner function, and facsimile function, for example. In this embodiment, the CPU 101 further judges which device, the CPU 101 itself or the GPU 170, should perform graphics processing to generate a screen image to be displayed on a display 134 in accordance with prescribed conditions and executes a suitable process for the result of judgment, which will be described in details later on.

The ROM 102 stores programs for the CPU 101 to execute and other data.

The S-RAM 103 serves as a workplace for the CPU 101 to execute programs and temporarily stores the programs, data to be used by the programs, and other data.

The NV-RAM 104 is a battery backed-up non-volatile memory and stores various settings related to image forming, the pixel count of the display 134, data about various screen images to be displayed on the display 134, and other data. The data about various screen images includes information about screen elements composing each screen image and the number of the screen elements.

The clock IC 105 indicates time and also serves as an internal timer to measure processing time, for example.

The fixed storage device 110 consists of a hard disk drive, for example, and stores programs and other data of various types.

The image reading device 120 is essentially provided with a scanner. The image reading device 120 obtains an image by scanning a document put on a platen and converts the obtained image into image data format.

Figure 2:
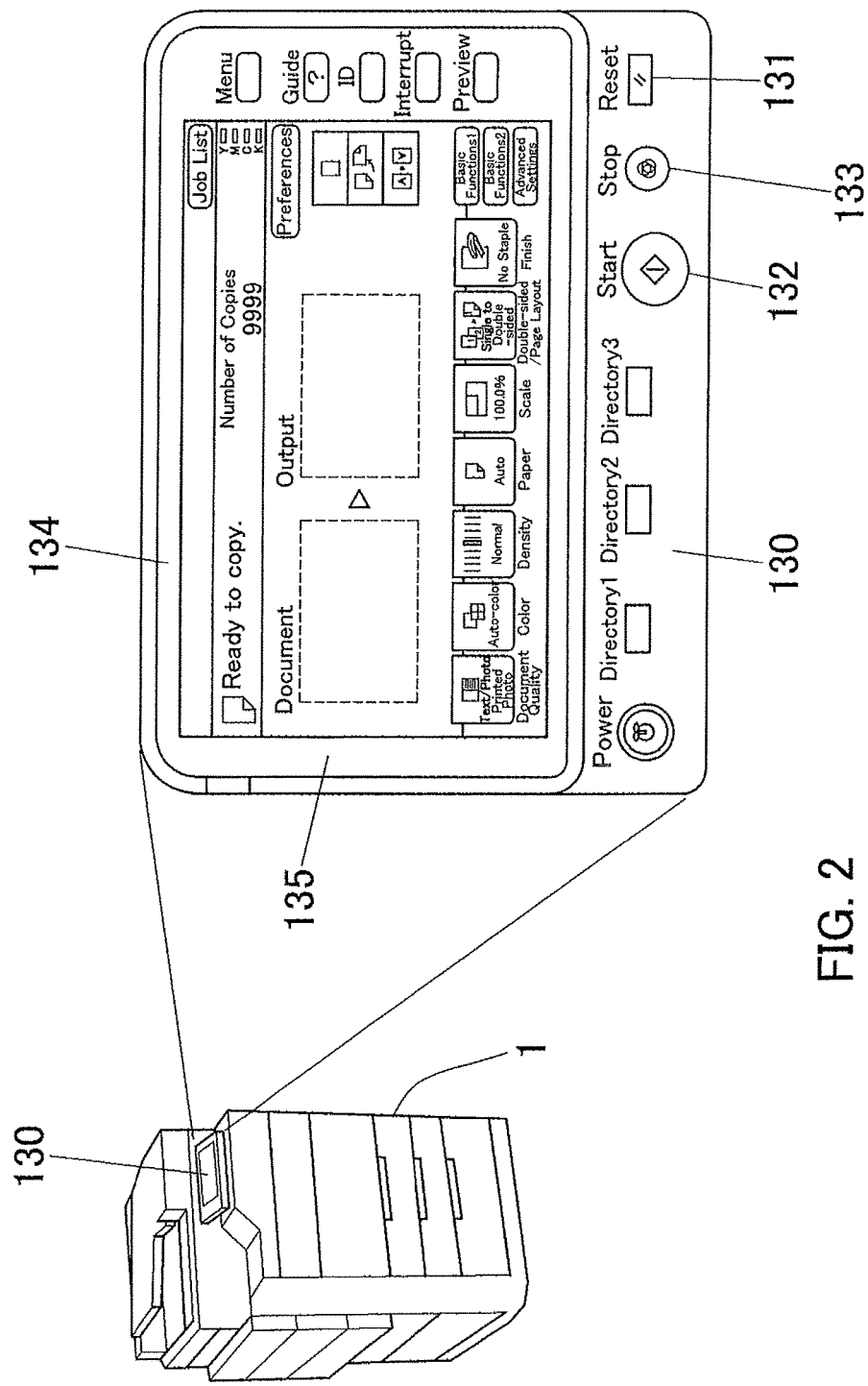
FIG. 2 illustrates an enlarged view of the operation screen.

The operation panel 130 allows the user to give instructions for running a job, for example, to the MFP 1 and to configure various settings of the MFP 1. As referred to the enlarged view of FIG. 2, the operation panel 130 is essentially provided with various hardware keys such as a reset key 131, a start key 132, and a stop key 133, a display 134, and a touch panel 135.

The reset key 131 allows the user to reset settings. The start key 132 allows the user to start operation, for example, start scanning. The stop key 133 allows the user to stop operation when it is pressed.

The display 134 is a liquid-crystal display device, for example, which displays messages, various operation screens, and other information. The touch panel 135 is disposed on the display screen of the display 134, and detects a touch event by the user.

The imaging device 140 prints on paper a copy image that is formed on the basis of print data received from an external apparatus or image data obtained from a document by the image reading device 120.

The printer controller 150 forms a copy image on the basis of print data received by the network interface 160.

The network interface (network I/F) 160 serves as a communication means that exchanges data with external apparatuses such as terminal apparatuses.

The GPU 170 is a special-purpose computing device that performs microprocessing optimally for graphics processing. The GPU 170 performs graphics processing to generate a screen image to be displayed on the display 134 upon receiving a command from the CPU 101.

Hereinafter, the operations of the MFP 1 illustrated in FIG. 1 will be described.

Each screen image to be displayed on the display 134 is composed of a set of multiple screen elements. As described above, types of screen element and the number of the screen elements are stored on a recording medium such as the NV-RAM 104 about each screen image. The screen elements are buttons, graphics (figures), and text strings, for example, and can be repositioned. When a thumbnail view screen is a screen image to be displayed on the display 134, each thumbnail image is counted as one screen element.

As for the MFP 1 according to this embodiment, the CPU 101 selects the CPU 101 itself or the GPU 170, whichever will perform graphics processing faster, although the CPU 101 and the GPU 170 of the MFP 1 both are capable of performing graphics processing to generate a screen image.

Figure 3:
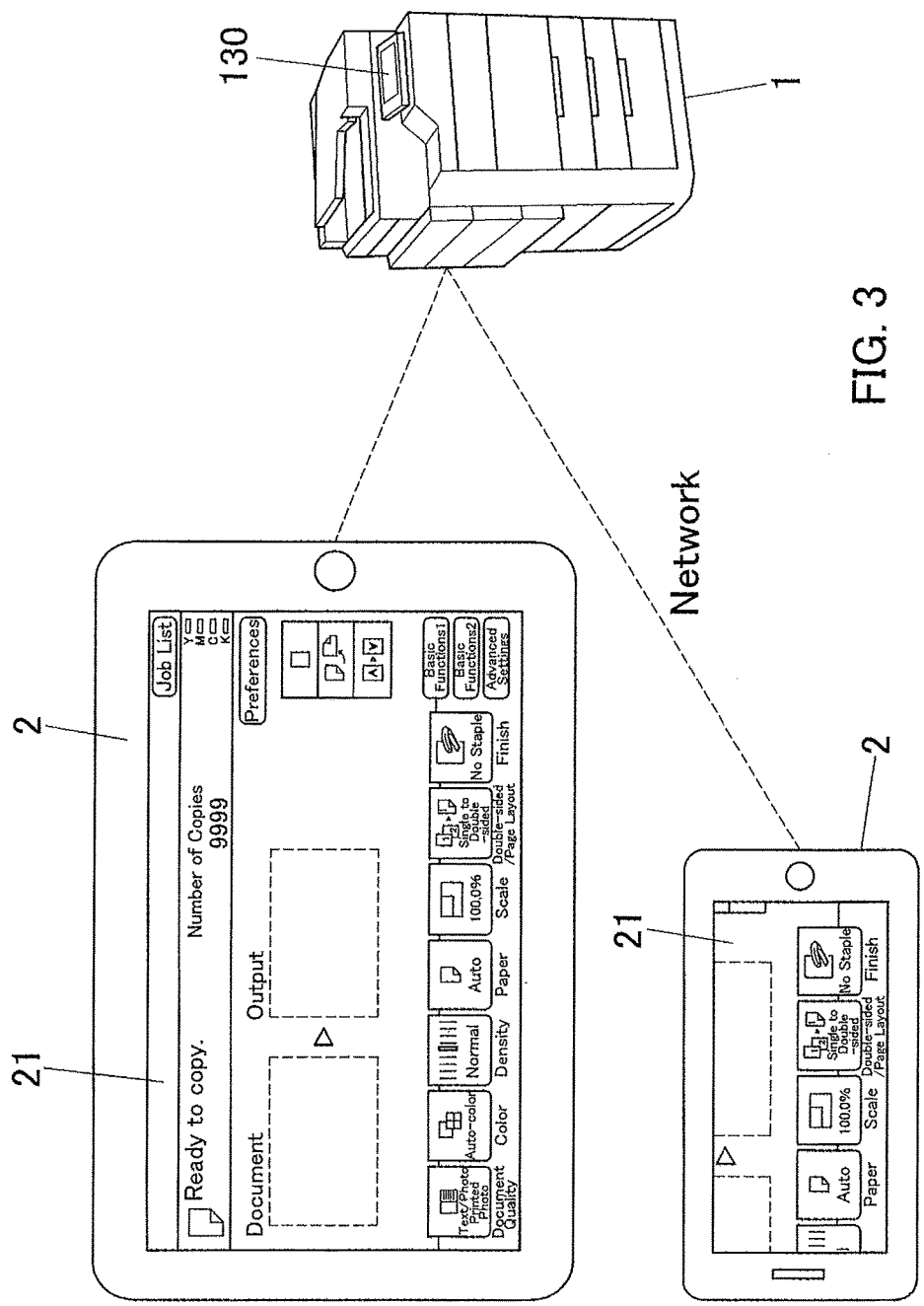
FIG. 3 is an explanatory view of an example in which an external portable terminal apparatus displays a screen displayed on the image processing apparatus.

Meanwhile, depending on the model, the MFP 1 is configured to allow one or more portable terminal apparatuses 2 such as tablet computers and smartphones to display on their displays 21 operation screen images displayed on the display 134 of the MFP 1 by transmitting the screen images to the portable terminal apparatuses 2 through a network, as illustrated in FIG. 3. If the MFP 1 according to this embodiment is of such a model, the CPU 101 or the GPU 170 also performs graphics processing to generate a screen image to be displayed on the displays 21 of the portable terminal apparatuses 2.

The time required for graphics processing by the CPU 101 varies depending on the pixel count of the display 134 (or the display 21 of the portable terminal apparatus 2) and the number of the screen elements. As long as the pixel count of the display 134 (or the display 21) is not changed, the time required for graphics processing by the CPU 101 increases with a higher number of the screen elements. The time required for graphics processing by the CPU 101 also increases with a higher pixel count of the display 134 (or the display 21).

In contrast, the time required for graphics processing by the GPU 170 hardly varies depending on the pixel count of the display 134 (or the display 21), or rather, it is almost constant. In this case, however, it is troublesome that the time for draw call batching as a preprocessing step of graphics processing is further required. The draw call batching is combining the attributes of all screen elements, such as textures, materials, and coordinates, into a single batch of data in a certain format. The CPU 101 performs this draw call batching and issues a command for graphics processing to the GPU 170 using the obtained data.

Therefore, the CPU 101 is selected if the time required for graphics processing by the CPU 101 is shorter than the time required for draw call batching by the CPU 101, and the GPU 170 is selected if it is longer than the time required for draw call batching by the CPU 101. As referred to FIG. 4, the judgement whether or not the time required for graphics processing by the CPU 101 is longer than the time required for draw call batching by the CPU 101 depends on the pixel count of the display 134 (or the display 21) and the number of the screen elements composing a screen image to be displayed on the display 134 (or on the display 21). As is understood from FIG. 4, an area S1 is an area in which the time required for graphics processing by the CPU 101 is longer than the time required for draw call batching by the CPU 101, i.e., it is an area in which the GPU 170 performs graphics processing faster. In contrast, an area S2 is an area in which the time required for graphics processing by the CPU 101 is shorter than the time required for draw call batching by the CPU 101, i.e., it is an area in which the CPU 101 performs graphics processing faster.

In this embodiment, as shown in FIGS. 5 and 6 tables, threshold values for judging which device, the CPU 101 or the GPU 170, should perform graphics processing, which are set in advance on the pixel count of the display 134 (or the display 21) and the number of the screen elements composing a screen image to be displayed on the display 134 (or the display 21).

Specifically, if the display 134 (or the display 21) has a resolution of WSVGA (as known as 600×1024 pixels) and a screen image is composed of 20 or more screen elements (refer to the row of "number of the elements" in FIGS. 5 and 6), for example, the GPU 170 will perform graphics processing; if the display 134 (or the display 21) has a resolution of WSVGA and a screen image is composed of less than 20 screen elements, the CPU 101 will perform graphics processing. If the display 134 (or the display 21) has a resolution of WVGA (as known as 480×800 pixels) and a screen image is composed of 50 or more screen elements, the GPU 170 will perform graphics processing; if the display 134 (or the display 21) has a resolution of WVGA and a screen image is composed of less than 50 screen elements, the CPU 101 will perform graphics processing. If the display 134 (or the display 21) has a resolution of WQVGA (as known as 273×400 pixels) and a screen image is composed of 100 or more screen elements, the GPU 170 will perform graphics processing; if the display 134 (or the display 21) has a resolution of WQVGA and a screen image is composed of less than 100 screen elements, the CPU 101 will perform graphics processing.

As referred to FIG. 5, a sample screen A is composed of a total of 202 screen elements with a breakdown of 50 buttons, 67 graphics, and 85 text strings. The GPU 170 will perform graphics processing to generate this sample screen A regardless of the number of the pixel count of the display 134 (or the display 21). As referred to FIG. 5, a sample screen B is composed of a total of 74 screen elements with a breakdown of 18 buttons, 27 graphics, and 29 text strings. The GPU 170 will perform graphics processing to generate this sample screen B if the display 134 (or the display 21) has a resolution of WSVGA or WVGA; the CPU 101 will perform graphics processing to generate this sample screen B if the display 134 (or the display 21) has a resolution of WQVGA.

As referred to FIG. 6, a sample screen C is composed of a total of 27 screen elements with a breakdown of 6 buttons, 9 graphics, and 12 text strings. The GPU 170 will perform graphics processing to generate this sample screen C if the display 134 (or the display 21) has a resolution of WSVGA; the CPU 101 will perform graphics processing to generate this sample screen C if the display 134 (or the display 21) has a resolution of WVGA or WQVGA. As referred to FIG. 6, a sample screen D is composed of a total of 4 screen elements with a breakdown of 0 buttons, 3 graphics, and 1 text string. The CPU 101 will perform graphics processing to generate this sample screen D regardless of which resolution, WSVGA, WVGA, or WQVGA, the display 134 (or the display 21) has.

Figure 7:
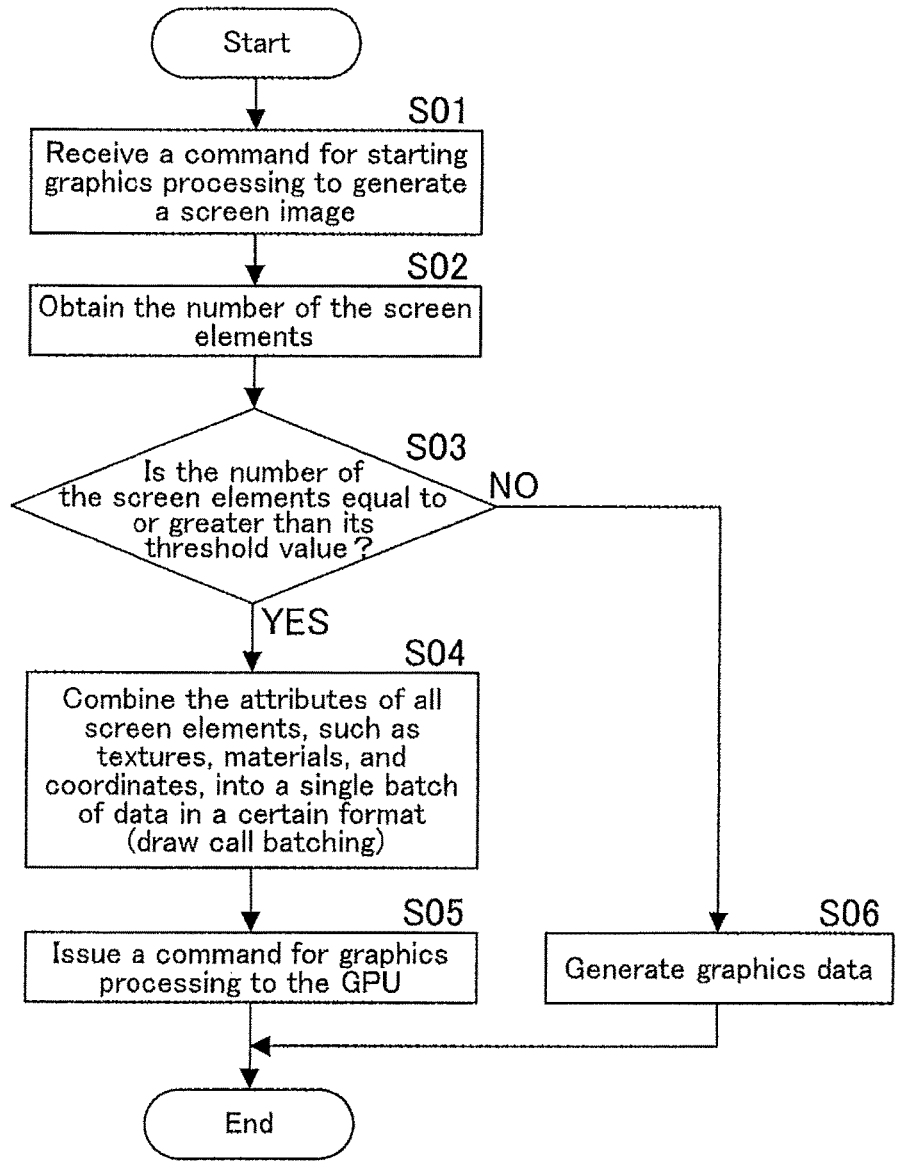
FIG. 7 is a flowchart representing an example in which the CPU of the image processing apparatus judges which device, the CPU itself or the GPU, should perform graphics processing.

FIG. 7 is a flowchart representing an example in which the MFP 1 judges which device, the CPU 101 or the GPU 170, should perform graphics processing. The operations represented by the FIG. 7 flowchart and the following flowcharts are conducted by the CPU 101 of the MFP 1 running operation programs stored on a recording medium such as the ROM 102. In this embodiment, the pixel count of the display 134 (or the display 21) is already known, and appropriate threshold values for this pixel count are set in advance on the number of the screen elements.

In Step S01, the CPU 101 receives from a program a command for starting graphics processing to generate a screen image. In Step S02, the CPU 101 obtains the number of the screen elements composing the screen image. In Step S03, the CPU 101 judges whether or not the number of the screen elements is equal to or greater than its threshold value set in advance, in other words, judge which device, the CPU 101 itself or the GPU 170, should perform graphics processing.

If the number of the screen elements is equal to or greater than its threshold value (YES in Step S03), this means that the GPU 170 should perform graphics processing. In Step S04, the CPU 101 thus performs draw call batching as a preprocessing step of graphics processing by the GPU 170, which is combining the attributes of all screen elements, such as textures, materials, and coordinates, into a single batch of data in a certain format. In Step S05, the CPU 101 issues a command for graphics processing to the GPU 170. Receiving this command for graphics processing, the GPU 170 performs graphics processing.

Back to Step S03, if the number of the screen elements is not equal to or greater than its threshold value (NO in Step S03), this means that the CPU 101 should perform graphics processing. In Step S06, the CPU 101 thus performs graphics processing to generate graphic data.

As described above, the CPU 101 judges which device, the CPU 101 itself or the GPU 170, should perform graphics processing with reference to the number of the screen elements composing a screen image. In this manner, the CPU 101 can correctly select the CPU 101 itself or the GPU 170, whichever will perform graphics processing faster, regardless of the number of the pixel count of the display 134 (or the display 21), contributing to a faster completion of graphics processing.

Figure 8:
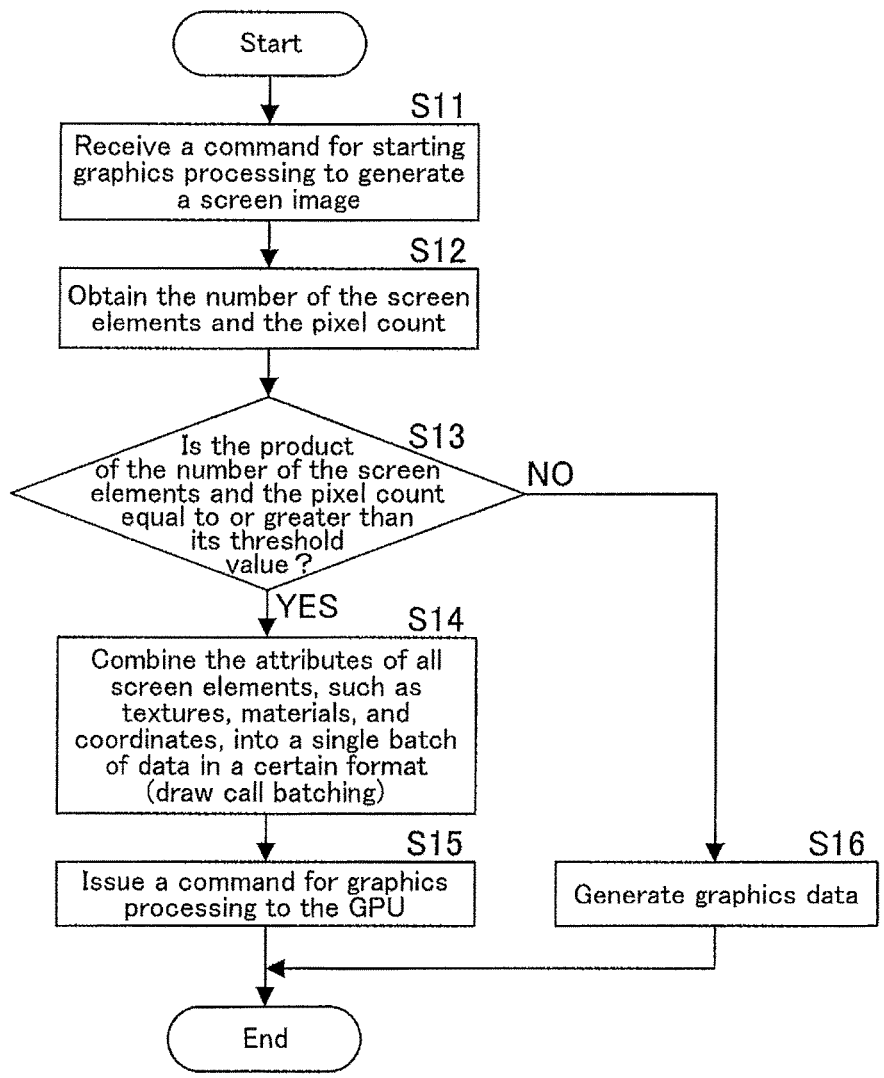
FIG. 8 is a flowchart representing another example in which the CPU of the image processing apparatus judges which device, the CPU itself or the GPU, should perform graphics processing.

FIG. 8 is a flowchart representing another example in which the MFP 1 judges which device, the CPU 101 or the GPU 170, should perform graphics processing.

Figure 4:
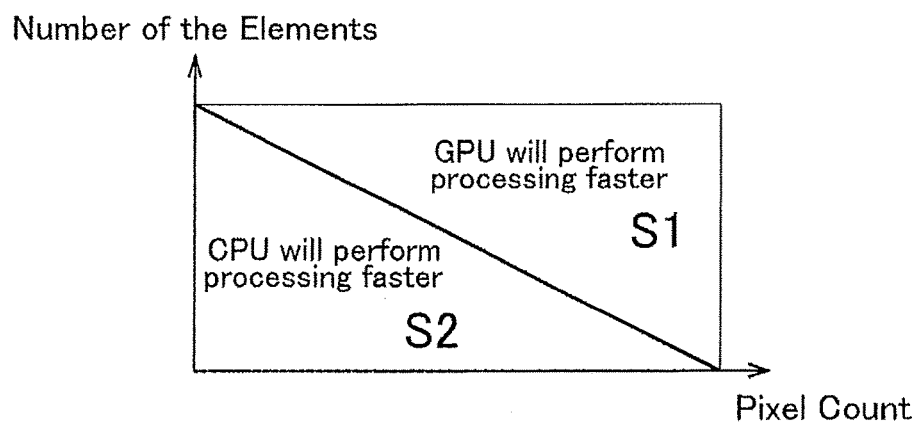
FIG. 4 is a view illustrating which device, the CPU or the GPU, will perform graphics processing faster depends on the pixel count of the display and the number of the screen elements composing a screen image to be displayed on the display.

In this example, threshold values are set in advance on the product of the following factors: the number of the screen elements composing a screen image and the pixel count of the display 134 (or the display 21). These threshold values can be represented by a boundary line between the areas S1 and S2 as indicated in FIG. 4.

In Step S11, the CPU 101 receives from a program a command for starting graphics processing to generate a screen image. In Step S12, the CPU 101 obtains the number of the screen elements composing the screen image and the pixel count of the display 134. To display the screen image on the display 21 of the portable terminal apparatus 2 instead of the display 134, the CPU 101 obtains the pixel count of the display 21 from the portable terminal apparatus 2.

In Step S13, the CPU 101 judges whether or not the product of the number of the screen elements and the pixel count is equal to or greater than its threshold value set in advance, in other words, judge which device, the CPU 101 itself or the GPU 170, should perform graphics processing.

If it is equal to or greater than its threshold value (YES in Step S13), this means that the GPU 170 should perform graphics processing. In Step S14, the CPU 101 thus performs draw call batching as a preprocessing step of graphics processing by the GPU 170. In Step S15, the CPU 101 issues a command for graphics processing to the GPU 170. Receiving this command for graphics processing, the GPU 170 performs graphics processing.

Back to Step S13, if the product of the number of the screen elements and the pixel count is not equal to or greater than its threshold value (NO in Step S13), this means that the CPU 101 should perform graphics processing. In Step S16, the CPU 101 thus performs graphics processing to generate graphic data.

As described above, the CPU 101 judges which device, the CPU 101 itself or the GPU 170, should perform graphics processing with reference to the product of the following factors: the number of the screen elements composing a screen image and the pixel count of the display 134 (or the display 21). In this manner, the CPU 101 can correctly select the CPU 101 itself or the GPU 170, whichever will perform graphics processing faster, contributing to a faster completion of graphics processing.

Figure 9:
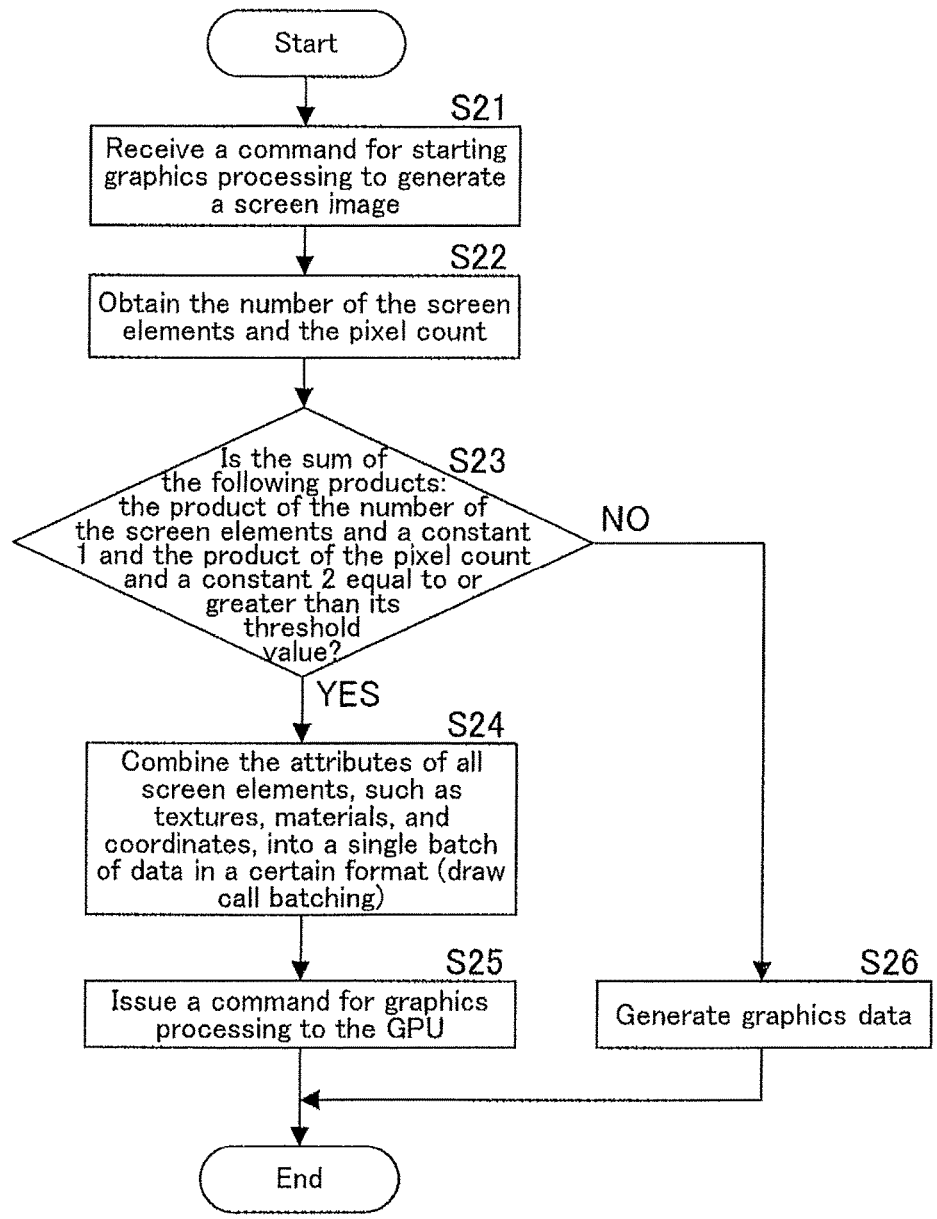
FIG. 9 is a flowchart representing yet another example in which the CPU of the image processing apparatus judges which device, the CPU itself or the GPU, should perform graphics processing.

FIG. 9 is a flowchart representing yet another example in which the MFP 1 judges which device, the CPU 101 or the GPU 170, should perform graphics processing.

In this example, threshold values are set in advance on the sum of the following products: the product of the number of the screen elements and a constant 1 (to be also referred to as "first constant") and the product of the pixel count of the display 134 (or the display 21) and a constant 2 (to be also referred to as "second constant"). These threshold values can be represented by a boundary line between the areas S1 and S2 in FIG. 4.

In Step S21, the CPU 101 receives from a program a command for starting graphics processing to generate a screen image. In Step S22, the CPU 101 obtains the number of the screen elements composing the screen image and the pixel count of the display 134. To display the screen image on the display 21 of the portable terminal apparatus 2 instead of the display 134, the CPU 101 obtains the pixel count of the display 21 from the portable terminal apparatus 2.

In Step S23, the CPU 101 judges whether or not the sum of the following products: the product of the number of the screen elements and the constant 1 and the product of the pixel count and the constant 2 is equal to or greater than its threshold value set in advance, in other words, judges which device, the CPU 101 itself or the GPU 170, should perform graphics processing.

If it is equal to or greater than its threshold value (YES in Step S23), this means that the GPU 170 should perform graphics processing. In Step S24, the CPU 101 thus performs draw call batching as a preprocessing step of graphics processing by the GPU 170. In Step S25, the CPU 101 issues a command for graphics processing to the GPU 170. Receiving this command for graphics processing, the GPU 170 performs graphics processing.

Back to Step S23, if the sum of the following products: the product of the number of the screen elements and the constant 1 and the product of the pixel count and the constant 2 is not equal to or greater than its threshold value (NO in Step S23), this means that the CPU 101 should perform graphics processing. In Step S26, the CPU 101 thus performs graphics processing to generate graphic data.

As described above, the CPU 101 judges which device, the CPU 101 itself or the GPU 170, should perform graphics processing with reference to the sum of the following products: the product of the number of the screen elements and the constant 1 and the product of the pixel count of the display 134 (or the display 21) and the constant 2. In this manner, the CPU 101 can correctly select the CPU 101 itself or the GPU 170, whichever will perform graphics processing faster, contributing to a faster completion of graphics processing.

Figure 10:
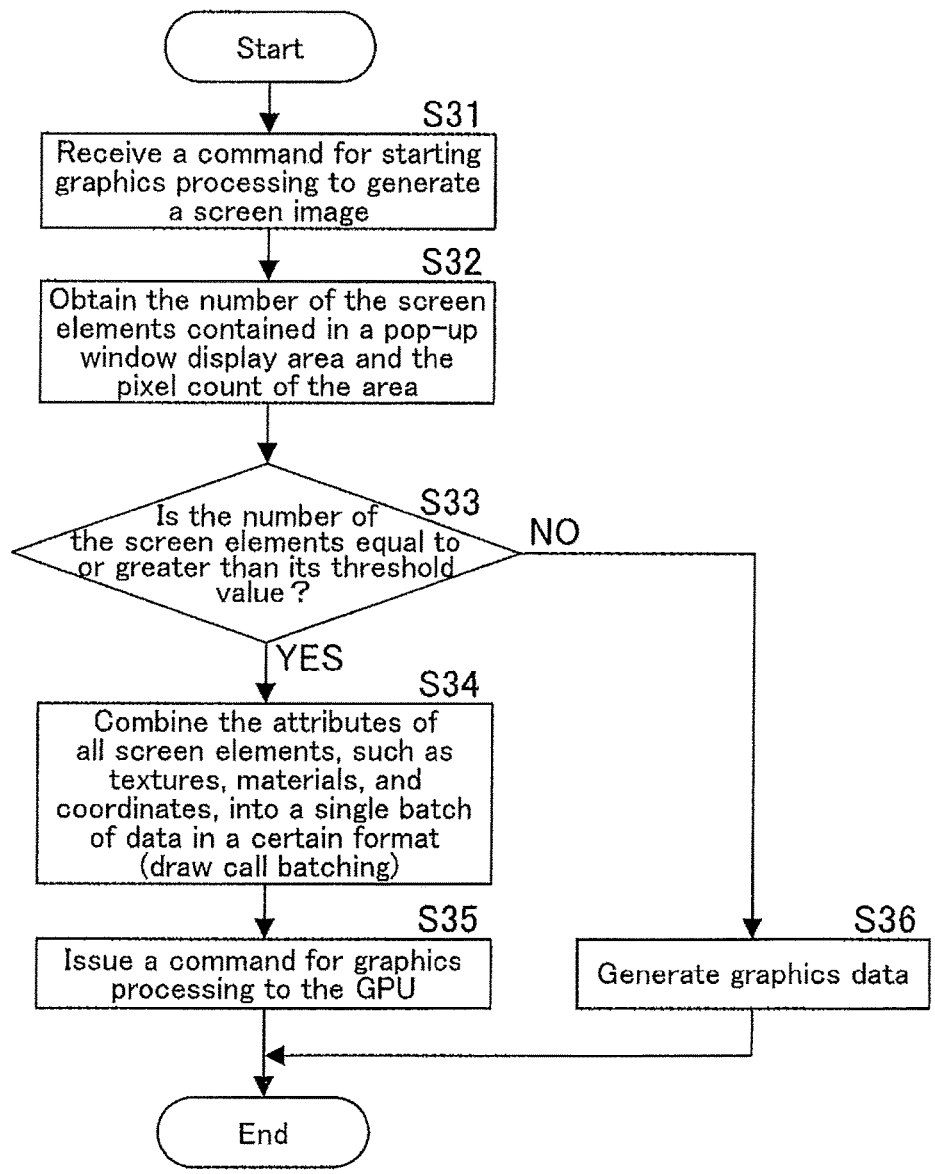
FIG. 10 is a flowchart representing still yet another example in which the CPU of the image processing apparatus judges which device, the CPU itself or the GPU, should perform graphics processing.

FIG. 10 is a flowchart representing still yet another example in which the MFP 1 judges which device, the CPU 101 or the GPU 170, should perform graphics processing. In this example, a screen image to be displayed includes a pop-up window image. The MFP 1 is configured such that the CPU 101 judges which device, the CPU 101 itself or the GPU 170, should perform graphics processing, by comparing the number of the screen elements contained in a pop-up window display area to its threshold value.

In Step S31, the CPU 101 receives from a program a command for starting graphics processing to generate a screen image. In Step S32, the CPU 101 obtains the number of the screen elements contained in a pop-up window display area. In Step S33, the CPU 101 judges whether or not the number of the screen elements is equal to or greater than its threshold.

If the number of the screen elements is equal to or greater than its threshold value (YES in Step S33), this means that the GPU 170 should perform graphics processing. In Step S34, the CPU 101 thus performs draw call batching as a preprocessing step of graphics processing by the GPU 170. In Step S35, the CPU 101 issues a command for graphics processing to the GPU 170. Receiving this command for graphics processing, the GPU 170 performs graphics processing.

Back to Step S33, if the number of the screen elements is not equal to or greater than its threshold value (NO in Step S33), this means that the CPU 101 should perform graphics processing. In Step S36, the CPU 101 thus performs graphics processing to generate graphic data.

In Step S33, the CPU 101 does not necessarily judge whether or not the number of the screen elements is equal to or greater than its threshold value. Alternatively, the CPU 101 may judge whether or not the product of the number of the screen elements and the pixel count is equal to or greater than its threshold value, similarly as in Step S13 in FIG. 8, or may judge whether or not the sum of the following products: the product of the number of the screen elements and the constant 1 and the product of the pixel count and the constant 2 is equal to or greater than it threshold value, similarly as in Step S23 in FIG. 9.

Figure 11:
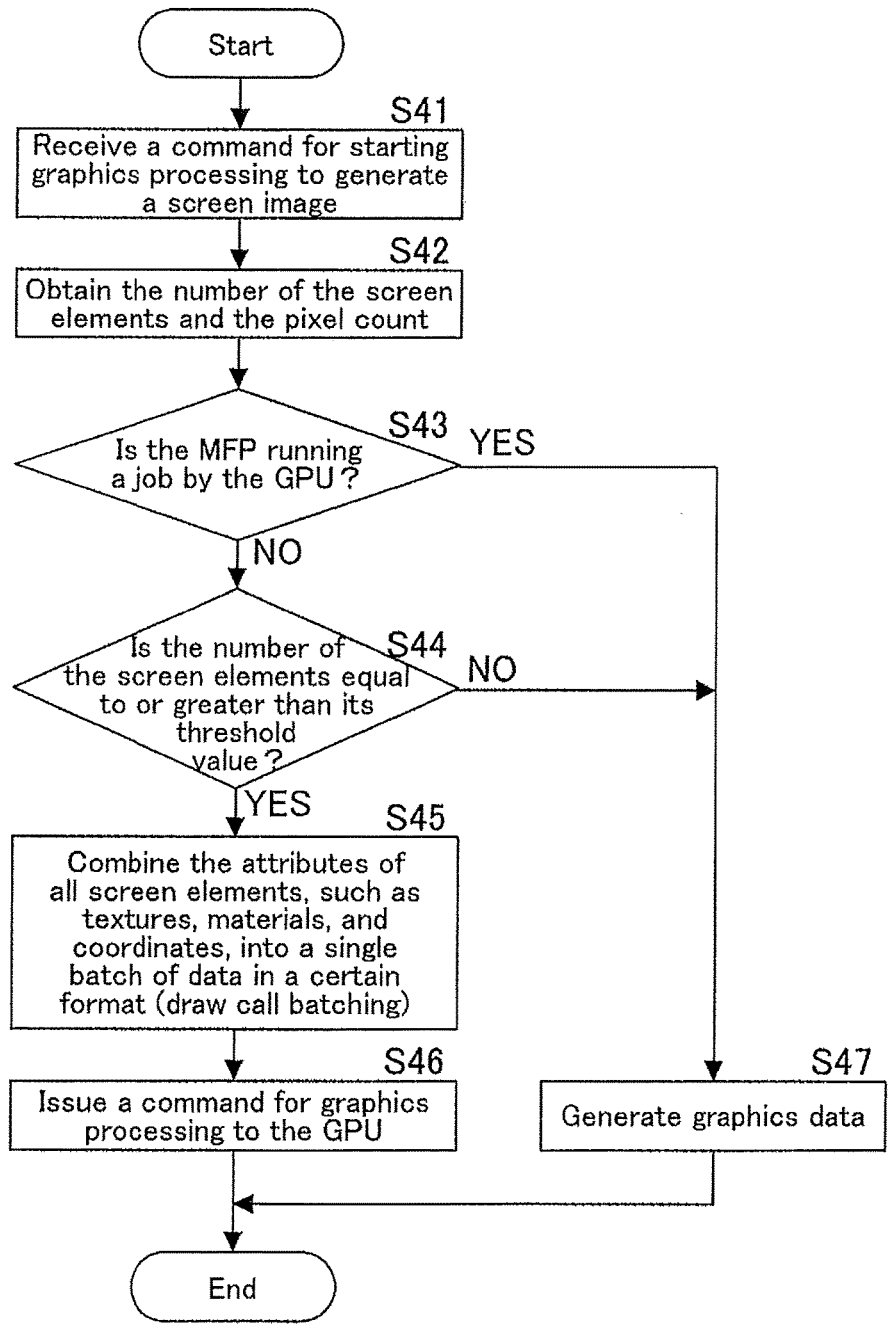
FIG. 11 is a flowchart representing further still yet another example in which the CPU of the image processing apparatus judges which device, the CPU itself or the GPU, should perform graphics processing.
Figure 12:
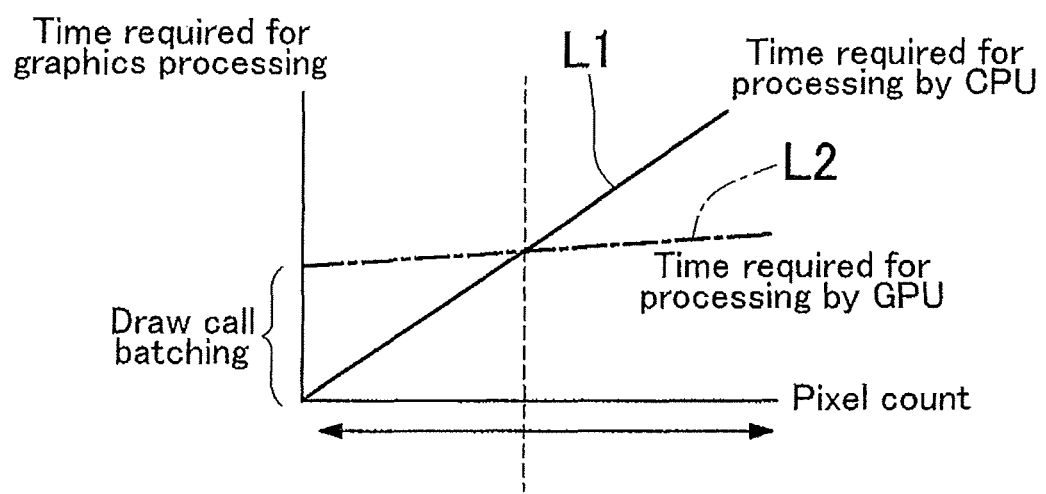
FIG. 12 is a view illustrating the relationships between the time required for graphics processing by the CPU and the pixel count of the display and the relationships between the time required for graphics processing by the GPU and the pixel count of the display.

FIG. 11 is a flowchart representing further still yet another example in which the MFP 1 judges which device, the CPU 101 or the GPU 170, should perform graphics processing. In this example, while the MFP 1 is running a job by the GPU 170, the CPU 101 always judges that the CPU 101 itself should perform graphics processing even if the number of the screen elements is equal to or greater than its threshold value. That is because the GPU 170 can perform graphics processing slowly while the GPU 170 is running a job.

The job run by the GPU 170 is a job including a task for creating a file in compact portable document format (compact PDF) or is a print job received from an external apparatus, for example.

In Step S41, the CPU 101 receives from a program a command for starting graphics processing to generate a screen image. In Step S42, the CPU 101 obtains the number of the screen elements composing the screen image and the pixel count of the display 134. To display the screen image on the display 21 of the portable terminal apparatus 2 instead of the display 134, the CPU 101 obtains the pixel count of the display 21 from the portable terminal apparatus 2.

In Step S43, the CPU 101 judges whether or not the MFP 1 is running a job by the GPU 170. If it is not running a job by the GPU 170 (NO in Step S43), the CPU 101 further judges in Step S44 whether or not the number of the screen elements is equal to or greater than its threshold value.

If the number of the screen elements is equal to or greater than its threshold value (YES in Step S44), this means that the GPU 170 should perform graphics processing. In Step S45, the CPU 101 thus performs draw call batching as a preprocessing step of graphics processing by the GPU 170. In Step S46, the CPU 101 issues a command for graphics processing to the GPU 170. Receiving this command for graphics processing, the GPU 170 performs graphics processing.

The MFP 1 may be running a job by the GPU 170 in Step S43 (YES in Step S43) and the number of the screen elements may not be equal to or greater than its threshold value in Step S44 (NO in Step S44). In either of these cases, the routine proceeds to Step S47, in which the CPU 101 performs graphics processing to generate graphic data.

In Step S44, the CPU 101 does not necessarily judge whether or not the number of the screen elements is equal to or greater than its threshold value. Alternatively, the CPU 101 may judge whether or not the product of the number of the screen elements and the pixel count is equal to or greater than its threshold value, similarly as in Step S13 in FIG. 8, or may judge whether or not the sum of the following products: the product of the number of the screen elements and the constant 1 and the product of the pixel count and the constant 2 is equal to or greater than it threshold value, similarly as in Step S23 in FIG. 9.

While one embodiment of the present invention has been described in details herein it should be understood that the present invention is not limited to the foregoing embodiment.

For example, the graphics processing device is mounted in an image processing apparatus in the above-described embodiment, which does not mean that it should be necessarily mounted in an image processing apparatus. Instead of being mounted in it, the graphics processing device may be mounted in an information processing apparatus such as a client computer or a portable terminal apparatus or another apparatus.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. A graphics processing device comprising:
a CPU corresponding to a general-purpose; and
a GPU corresponding to a special-purpose for graphics processing, the GPU being configured to necessitate draw call batching before the GPU starts its operation, wherein:
the CPU judges which device, the CPU itself or the GPU, should perform graphics processing to generate a screen image to be displayed on a display, with reference to a product of a number of screen elements composing the screen image and a pixel count of the display; and
the CPU performs graphics processing to generate the screen image if the CPU judges that the CPU itself should perform graphics processing, and the CPU performs draw call batching then makes the GPU perform graphics processing to generate the screen image if the CPU judges that the GPU should perform graphics processing.

2. The graphics processing device according to claim 1, wherein the CPU judges that the CPU itself should perform graphics processing if the number of the screen elements is not equal to or greater than a threshold value set in advance, and the CPU judges that the GPU should perform graphics processing if it is equal to or greater than the threshold value.

3. The graphics processing device according to claim 1, wherein the CPU judges that the CPU itself should perform graphics processing if the product of the number of the screen elements and the pixel count of the display is not equal to or greater than a threshold value set in advance, and the CPU judges that the GPU should perform graphics processing if it is equal to or greater than the threshold value.

4. The graphics processing device according to claim 1, wherein the CPU judges that the CPU itself should perform graphics processing if the sum of the following products: the product of the number of the screen elements and a first constant and the product of the pixel count of the display and a second constant is not equal to or greater than a threshold value set in advance, and the CPU judges that the GPU should perform graphics processing if it is equal to or greater than the threshold value.

5. The graphics processing device according to claim 1, wherein:
the screen image includes a pop-up window image; and
the number of the screen elements corresponds to the number of screen elements contained in a pop-up window display area.

6. The graphics processing device according to claim 1, wherein:
the screen image includes a pop-up window image; and
the number of the screen elements corresponds to the number of screen elements contained in a pop-up window display area and the pixel count of the display corresponds to the pixel count of the pop-up window display area.

7. An image processing apparatus comprising the graphics processing device according to claim 1.

8. The image processing apparatus according to claim 7, wherein the CPU always judges that the CPU itself should perform graphics processing while the image processing apparatus is running a job by using the GPU.

9. The image processing apparatus according to claim 8, wherein the job is a job including a task for creating a file in compact PDF or is a print job received from an external apparatus.

10. A graphics processing method to be implemented by a graphics processing device, the graphics processing device comprising:
a CPU corresponding to a general-purpose; and
a GPU corresponding to a special-purpose for graphics processing, the GPU being configured to necessitate draw call batching before the GPU starts its operation, the graphics processing method comprising the following steps of the CPU:

judging which device, the CPU itself or the GPU, should perform graphics processing to generate a screen image to be displayed on a display with reference to a product of a number of screen elements composing the screen image and a pixel count of the display; and performing graphics processing to generate the screen image if it is judged that the CPU should perform graphics processing, and performing draw call batching then making the GPU perform graphics processing to generate the screen image if it is judged that the GPU should perform graphics processing.

11. A non-transitory computer-readable recording medium storing a graphics processing program for a graphics processing device, the graphics processing device comprising:

a CPU corresponding to a general-purpose; and a GPU corresponding to a special-purpose for graphics processing, the GPU being configured to necessitate draw call batching before the GPU starts its operation, the graphics processing program to make the CPU execute:

judging which device, the CPU itself or the GPU, should perform graphics processing to generate a screen image to be displayed on a display with reference to a product of a number of screen elements composing the screen image and a pixel count of the display; and performing graphics processing to generate the screen image if it is judged that the CPU should perform graphics processing, and performing draw call batching then making the GPU perform graphics processing to generate the screen image if it is judged that the GPU should perform graphics processing.

12. The non-transitory computer-readable recording medium according to claim 11, storing the graphics processing program to make the CPU execute judging that the CPU itself should perform graphics processing if the number of the screen elements is not equal to or greater than a threshold value set in advance and judging that the GPU should perform graphics processing if it is equal to or greater than the threshold value.

13. The non-transitory computer-readable recording medium according to claim 11, storing the graphics processing program to make the CPU execute judging that the CPU itself should perform graphics processing if the product of the number of the screen elements and the pixel count of the display is not equal to or greater than a threshold value set in advance and judging that the GPU should perform graphics processing if it is equal to or greater than the threshold value.

14. The non-transitory computer-readable recording medium according to claim 11, storing the graphics processing program to make the CPU execute judging that the CPU itself should perform graphics processing if the sum of the following products: the product of the number of the screen elements and a first constant and the product of the pixel count of the display and a second constant is not equal to or greater than a threshold value set in advance and judging that the GPU should perform graphics processing if it is equal to or greater than the threshold value.

15. The non-transitory computer-readable recording medium according to claim 11, storing the graphics processing program, wherein:

the screen image includes a pop-up window image; and the number of the screen elements corresponds to the number of screen elements contained in a pop-up window display area.

16. The non-transitory computer-readable recording medium according to claim 11, storing the graphics processing program, wherein:

the screen image includes a pop-up window image; and the number of the screen elements corresponds to the number of screen elements contained in a pop-up window display area and the pixel count of the display corresponds to the pixel count of the pop-up window display area.

17. A graphics processing device comprising:

a CPU corresponding to a general-purpose; and a GPU corresponding to a special-purpose for graphics processing, the GPU being configured to necessitate draw call batching before the GPU starts its operation, wherein:

the CPU judges which device, the CPU itself or the GPU, should perform graphics processing to generate a screen image to be displayed on a display, with reference to a combination of a number of screen elements composing the screen image and a pixel count of the display; and the CPU performs graphics processing to generate the screen image if the CPU judges that the CPU itself should perform graphics processing, and the CPU performs draw call batching then makes the GPU perform graphics processing to generate the screen image if the CPU judges that the GPU should perform graphics processing, wherein the CPU judges which device, the CPU itself or the GPU, should perform graphics processing with reference to (i) a time required for draw call batching depending on the number of the screen elements and the pixel count of the display, and (ii) a time required by graphics processing by the CPU itself.

18. The graphics processing device according to claim 17, wherein the CPU judges which device, the CPU itself or the GPU, should perform graphics processing with reference to (i) a time required for draw call batching relating to the number of the screen elements and the pixel count of the display, and (ii) a time required by graphics processing by the CPU itself.

* * * * *